United States Patent [19]

Stephens et al.

[11] Patent Number: 5,599,060
[45] Date of Patent: Feb. 4, 1997

[54] CHILD'S BOOSTER SEAT FOR VEHICLES

[75] Inventors: William B. Stephens, Boulder; Joel M. Kramer, Westminster, both of Colo.

[73] Assignee: Gerry Baby Products Company, Thornton, Colo.

[21] Appl. No.: 554,266

[22] Filed: Nov. 6, 1995

[51] Int. Cl.⁶ ............................................. B60N 2/28
[52] U.S. Cl. ................................. 297/256.15; 297/488
[58] Field of Search ........................... 297/250.1, 256.15, 297/488, 487, 468, 485

[56] References Cited

U.S. PATENT DOCUMENTS

| | | | |
|---|---|---|---|
| 2,002,946 | 5/1935 | Jacobs | 241/5 |
| 3,313,511 | 4/1967 | Koerner et al. | 248/361 |
| 3,572,833 | 3/1971 | Pavliscak | 297/389 |
| 3,606,453 | 9/1971 | Cicero | 297/254 |
| 3,713,693 | 1/1973 | Cadiou | 297/389 |
| 3,794,379 | 2/1974 | Furey | 297/250 |
| 3,860,261 | 1/1975 | Takada | 280/150 SB |
| 3,955,734 | 5/1976 | Reese | 224/58 |
| 4,067,608 | 1/1978 | Von Wimmersperg | 297/256.15 X |
| 4,112,521 | 9/1978 | Uke | 2/452 |
| 4,146,268 | 3/1979 | Bost | 297/389 |
| 4,236,755 | 12/1980 | Pollitt et al. | 297/483 |
| 4,243,266 | 1/1981 | Anderson | 297/483 |
| 4,275,923 | 6/1981 | Molnar | 297/250 |
| 4,289,352 | 9/1981 | Ashworth | 297/473 |
| 4,291,915 | 9/1981 | Cox | 297/193 |
| 4,342,483 | 8/1982 | Takada | 297/488 |
| 4,361,258 | 11/1982 | Clark | 224/150 |
| 4,461,510 | 7/1984 | Cunningham et al. | 297/250 |
| 4,500,135 | 2/1985 | Kincheloe | 297/256.15 X |
| 4,591,208 | 5/1986 | McDonald et al. | 297/256.15 X |
| 4,592,592 | 6/1986 | Peek | 297/483 |
| 4,609,205 | 9/1986 | McKeever | 280/808 |
| 4,643,474 | 2/1987 | Wise et al. | 254/250 |
| 4,648,625 | 3/1987 | Lynch | 280/808 |
| 4,756,685 | 8/1988 | Sudoh et al. | 297/488 |
| 4,832,367 | 5/1989 | Lisenby | 280/808 |
| 4,984,845 | 1/1991 | Knoedler et al. | 297/250 |
| 5,255,940 | 10/1993 | Kornblum et al. | 280/808 |
| 5,275,464 | 1/1994 | Eichhorn et al. | 297/250.1 |
| 5,335,957 | 8/1994 | Golder | 297/482 |

FOREIGN PATENT DOCUMENTS

| | | |
|---|---|---|
| 2072003 | 9/1981 | United Kingdom . |
| 2178649 | 2/1987 | United Kingdom . |

*Primary Examiner*—Milton Nelson, Jr.
*Attorney, Agent, or Firm*—Biebel & French

[57] ABSTRACT

A child's booster seat for use in a vehicle having a vehicle seat and a vehicle passenger restraint system, .The booster seat includes a base and a shield attached to an upper end of the base. A lap belt for the passenger restraint system is used to maintain the shield in position on the base and also to form a direct restraint on a child in the seat. A shoulder belt adjustment strap is also provided for positioning a shoulder belt of the passenger restraint system downwardly away from a child's head and neck area when the base is used without the shield in place. The adjustment strap may be positioned to extend upwardly along either side of the booster seat to facilitate use of the booster seat with passenger restraint systems on either a right or left side of a vehicle.

18 Claims, 4 Drawing Sheets

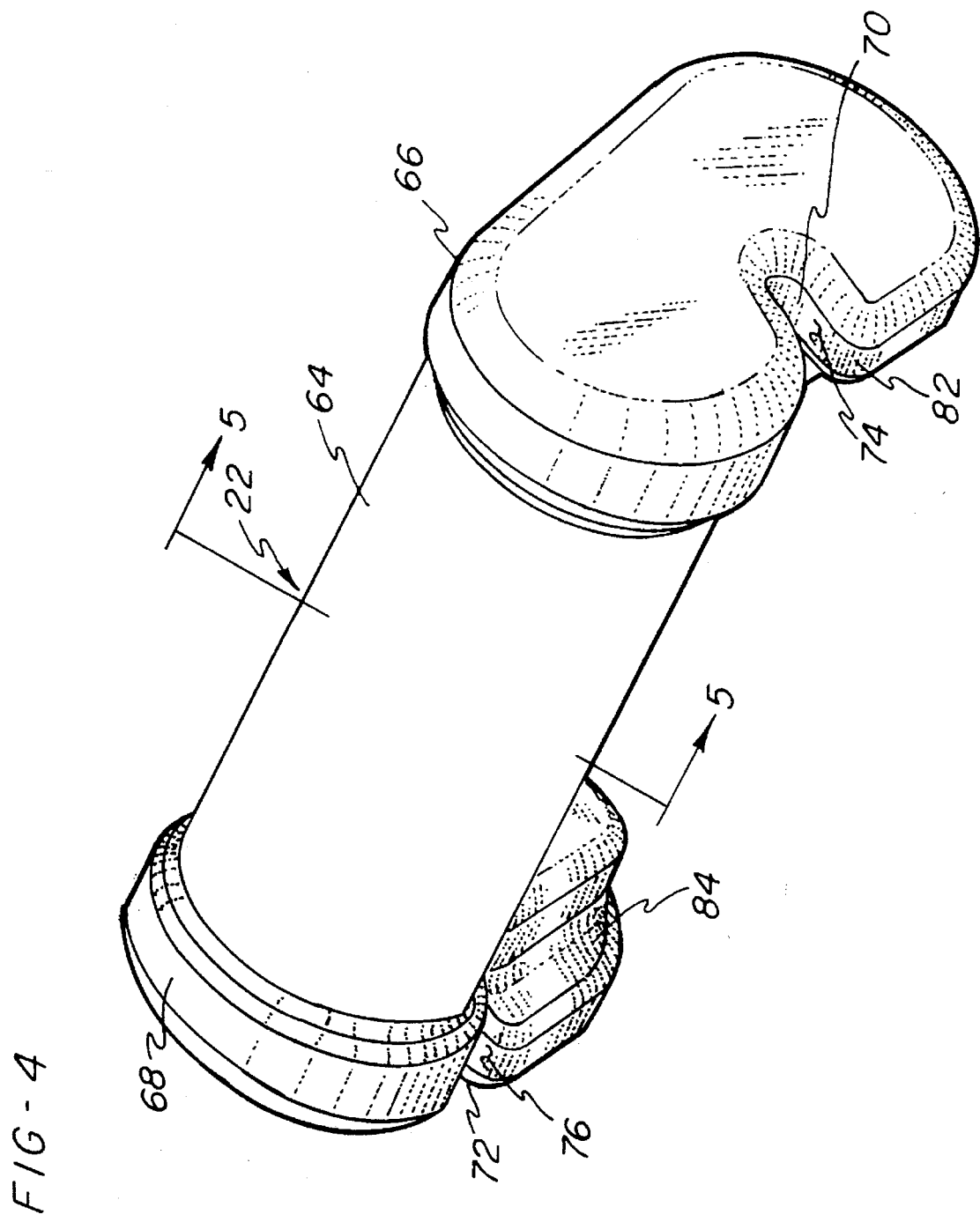

5,599,060

CHILD'S BOOSTER SEAT FOR VEHICLES

BACKGROUND OF THE INVENTION

This invention relates to a child's booster seat and, more particularly, to a child's booster seat for use in a vehicle having a vehicle seat and a vehicle passenger restraint system.

Various car seats are available for safely retaining a child within a vehicle while utilizing the seat belts provided with the vehicle. Typically, car seats may be divided into two general categories including car seats intended to safely retain infants and small children, and those which act as booster seats for older children who have outgrown the former car seats. Car seats for smaller children are generally provided with belts which extend across the chest of the child in order to retain the child within a car seat shell, whereas booster seats for older children generally comprise a booster seat base with a shield attached thereto extending across the lap and in front of the chest of the child. Booster seats provide the advantage of allowing a child to sit at an elevated level to allow the child to view out of a vehicle window. Further, booster seats generally cooperate with a seat belt of the vehicle restraint system to retain the child in place in the event of an accident.

A preferred form of a booster seat provides easy entry and egress to and from the seat, and convenient locating of the seat belts for the vehicle restraint system relative to the booster seat. In addition, the booster seat should include means for cooperating with the vehicle safety belt to safely maintain the booster seat in place while also safely maintaining a child in position on the booster seat.

SUMMARY OF THE INVENTION

The present invention provides a child's booster seat for use in a vehicle having a vehicle seat and a vehicle passenger restraint system, such as a seat belt system.

The child's booster seat generally includes a base which is adapted to rest on a vehicle seat and which will support a child in an elevated position on the vehicle seat, and including a shield adapted to be supported on the base to form a barrier in front of the child.

The base includes opposing sides which define first and second receptor portions in the form of sockets for receiving engagement portions formed on opposing ends of the shield. The engagement portions are slidably received within the sockets whereby the shield is easily located in position on the base. The shield includes a pair of slots adjacent to the engagement portions wherein the slots are adapted to receive the lap belt of a vehicle passenger restraint system. When the lap belt is positioned within the slots, it ensures that the shield remains in position on the base such that the booster seat as a whole is maintained in position on the vehicle seat. In addition, the slots direct the lap belt to be positioned in close engagement with a child's lap to further ensure minimum movement of the child during an accident.

In addition, the base may be used separately from the shield to support a child, and a shoulder belt adjustment strap is provided for engaging the shoulder belt of a vehicle passenger restraint system when the base is used without the shield. The shoulder belt adjustment strap is attached to a bottom portion of the base and includes an end which may be detachably attached to a shoulder belt for the vehicle passenger restraint system. The adjustment strap pulls the shoulder belt downwardly to lower the position of the shoulder belt relative to a child sitting on the base. In this manner, the shoulder belt is not positioned at a location which may endanger a child, such as a location extending across the child's neck. The adjustment strap may be positioned to extend upwardly along either side of the booster seat to a location in front of the child such that the attachment strap may be used in association with vehicle seat belts on either the right or left side of the vehicle.

Therefore, it is an object of the present invention to provide a booster seat for use in a vehicle having a vehicle seat and a vehicle passenger restraint system.

It is the further object of the invention to provide a booster seat which provides convenient entry and egress for a child to and from the booster seat.

It is yet another object of the invention to provide a booster seat which permits a vehicle lap seat belt to be positioned closely adjacent to a child's lap for maintaining the child in position on the seat.

Other objects and advantages of the invention will be apparent from the following description, the accompanying drawings and the appended claims.

BRIEF DESCRIPTION OF THE DRAWINGS

FIG. 4 is a perspective view of the shield for the booster seat; and

DETAILED DESCRIPTION OF THE PREFERRED EMBODIMENT

Figure 1:
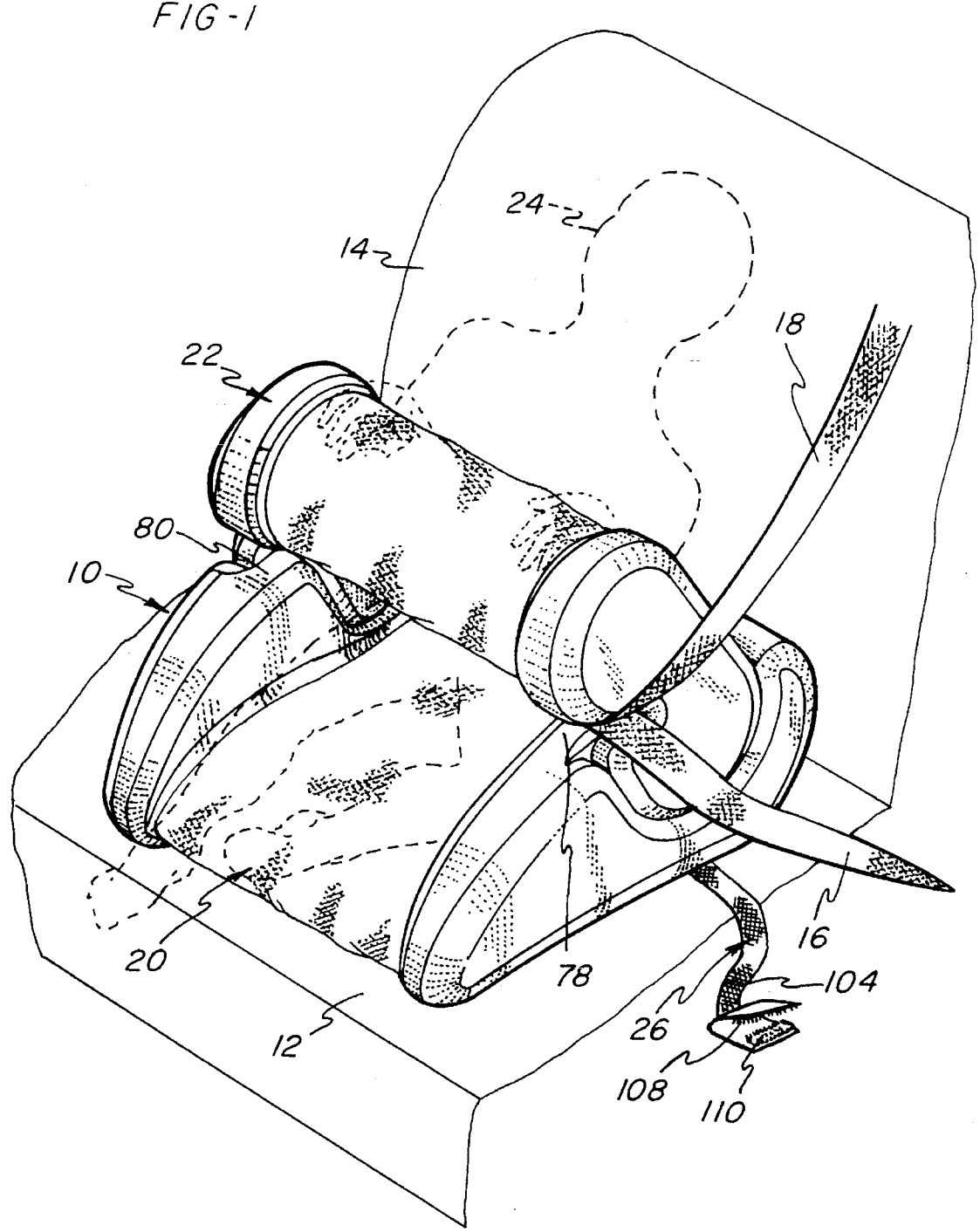
FIG. 1 is a perspective view illustrating the booster seat of the present invention in use on a vehicle seat.

Referring to FIG. 1, the child's booster seat 10 of the present invention is illustrated supported on a conventional vehicle seat 12 and including a back cushion 14. The booster seat 10 is intended to be used in cooperation with a conventional vehicle passenger restraint system including a lap belt 16 and shoulder belt 18.

The booster seat 10 generally includes a base 20, a shield 22 supported on the base 20 for positioning as a barrier in front of a child 24, and a shoulder belt adjustment strap 26 attached to the base 20.

Figure 2:
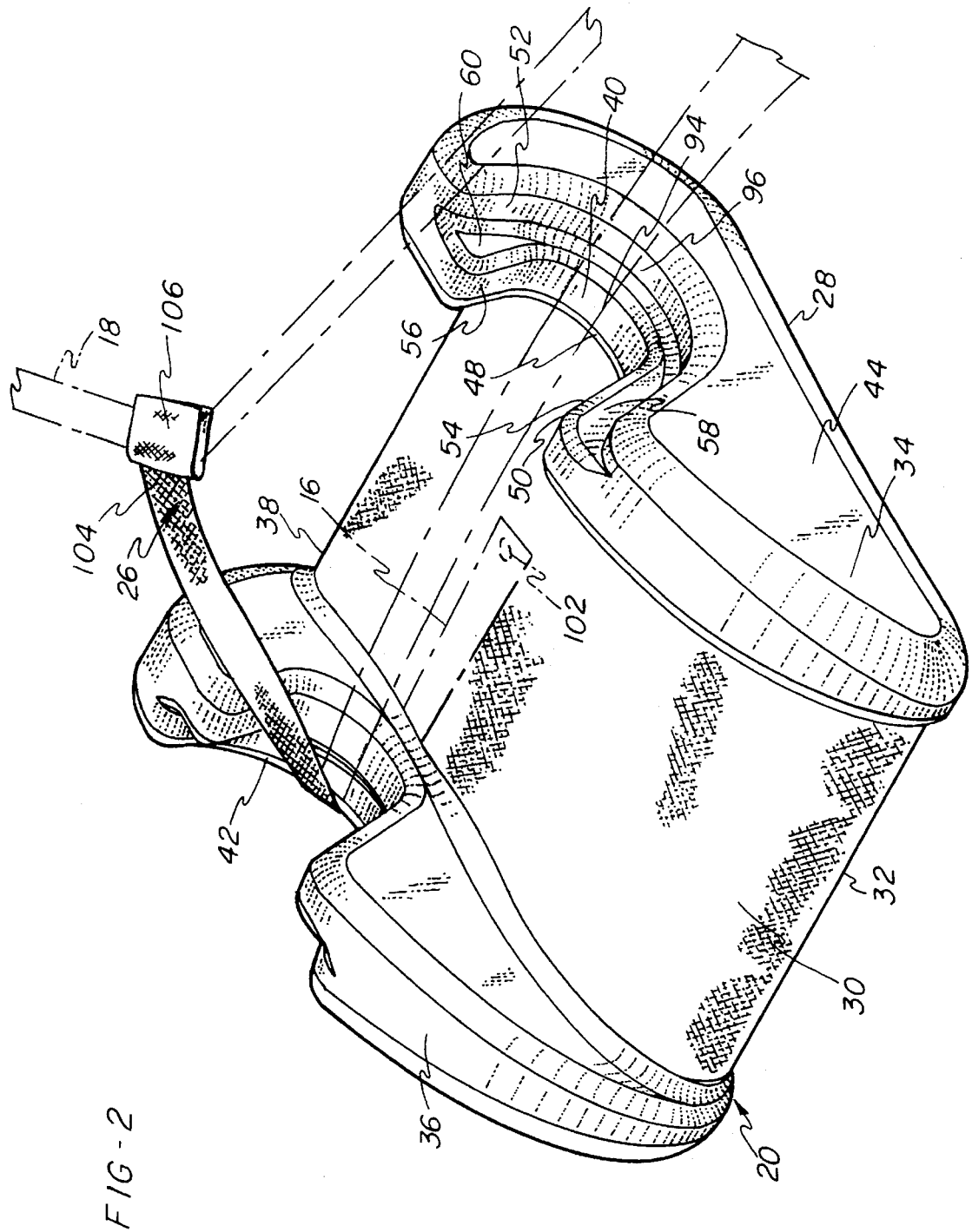
FIG. 2 is a perspective view of the base for the booster seat.

Referring to FIG. 2, the base 20 is illustrated and includes a bottom surface 28 which is formed with a concave curvature for cooperating with the vehicle seat 12, and an upper surface 30 formed with a convex curvature toward a front end 32 thereof and adapted to support a child 24 thereon. The upper surface 30 is preferably provided with a cloth covering and may also be provided with padding to form a comfortable seat for the child.

The base 20 is further provided with opposing first and second sides 34, 36 which extend upwardly from the upper surface 30, and which extend from the front end 32 of the base 22 to a rear end 38 thereof. Each of the sides 34, 36 is formed with a respective receptor portion or socket 40, 42 adjacent to the rear end 38 for facilitating mounting of the shield 22 to the base 20.

Figure 3:
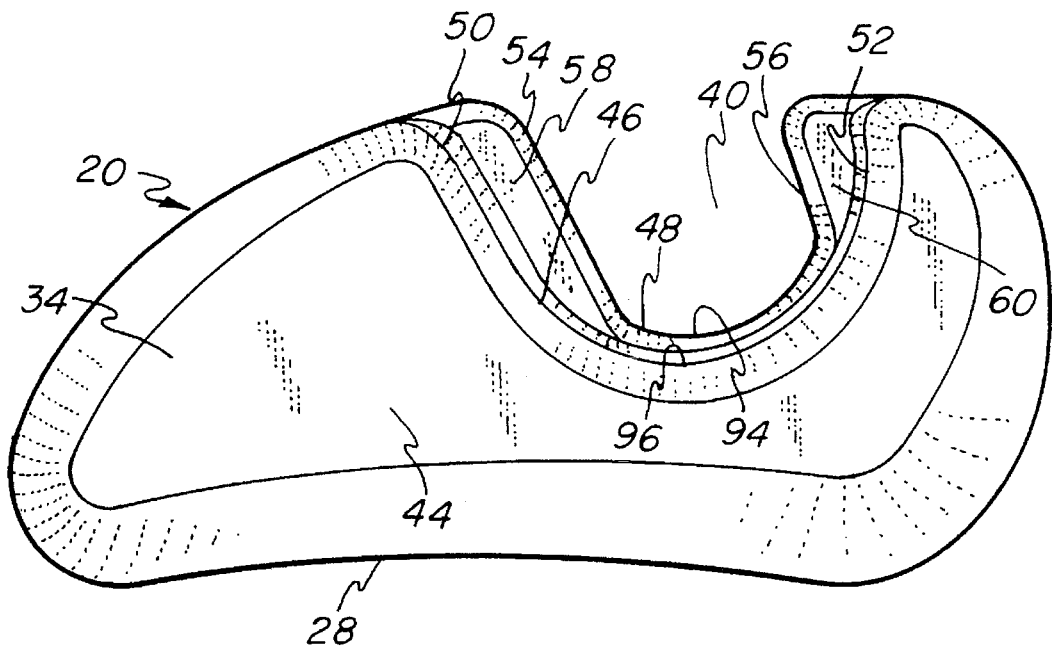
FIG. 3 is a side elevational view of the base for the booster seat.

Referring to FIG. 3, the sockets 40, 42 will be described with respect to the socket 40, it being understood that the socket 42 is provided with an identical construction on the opposing side of the base 20. The socket 40 extends from an outer surface 44 of the side 34 to an opposing inner surface on the side 34. The socket 40 is defined by a first, lateral locking cut-out 46 and a second, longitudinal locking cut-out 48. The first cut-out 46 is generally formed with an arcuate contour including front and rear faces 50, 52 located forwardly and rearwardly, respectively, from generally vertically extending straight surfaces 54, 56 of the second cut-out 48. A front laterally facing surface 58 is defined between the surfaces 50 and 54, and a rear laterally facing surface 60 is defined between the surfaces 52 and 56. The surfaces 58, 60 cooperate with corresponding surfaces on the shield 22 to prevent the shield from moving laterally either left or right, and the surfaces 54, 56 facing each other in the second cut-out 48 cooperate with the shield 22 to prevent the shield 22 from moving in a forward or rearward longitudinal direction, as will be described further below.

Referring to FIG. 4, the shield 22 includes a central barrier portion 64 positioned between opposing first and second ends 66, 68. The barrier portion 64 may be provided with padding and a cloth covering similar to that provided for the seat portion 30 of the base 20. Each of the ends 66, 68 is provided with a forwardly facing belt receiving slot 70, 72, and it should be noted that lower surfaces 74, 76 of the respective slots 70, 72 are formed such that they will lie in substantially the same plane as upper surfaces 78, 80 on the sides 34, 36 of the base when the shield 22 is positioned on the base 20.

Figure 5:
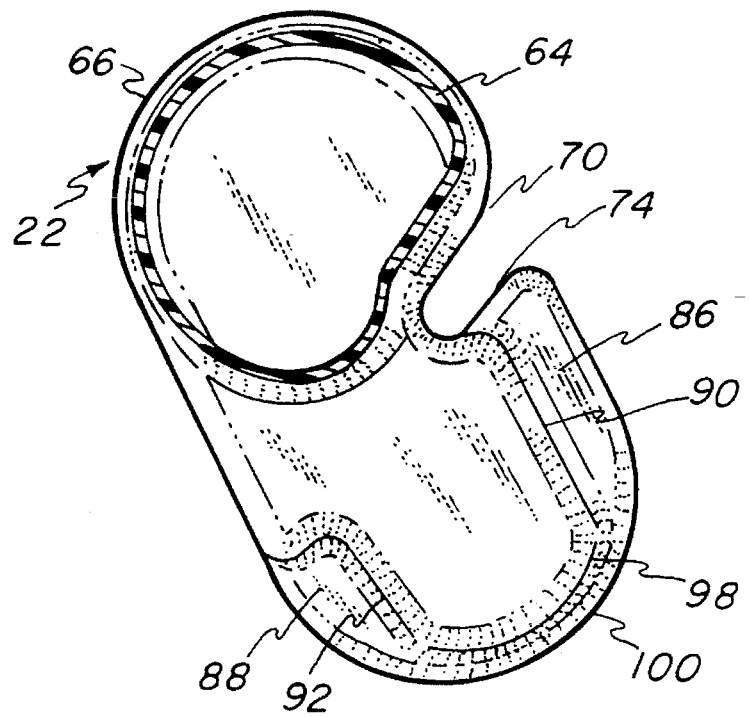
FIG. 5 is a cross sectional view of the shield taken along line 5—5 in FIG. 4.

The ends 66, 68 of the shield 22 are each formed with an engagement portion 82, 84 which include surfaces configured to correspond to the surfaces of the sockets 40, 42 in the base 20. FIG. 5 illustrates the construction of the engagement portions 82, 84 with reference to the engagement portion 82, it being understood that the engagement portion 84 is formed with an identical construction.

The engagement portion 82 of the end 66 includes front and rear lateral engagement surfaces 86, 88 for cooperating with the surfaces 58, 60 of the first cut-out portion 46 on base 20. The engagement surfaces 86, 88 are substantially perpendicular to and extend forwardly and rearwardly from longitudinal engagement surfaces 90, 92. The longitudinal engagement surfaces 90, 92 are adapted to cooperate with the facing surfaces 54, 56 to thereby limit movement of the shield 22 in a longitudinal direction relative to the base 20, while the lateral engagement surfaces 86, 88 cooperate with the surfaces 58, 60 to limit relative lateral movement between the shield 22 and the base 20.

In use, the shield 22 is positioned on the base 20 by sliding the engagement portions 82, 84 downwardly into the sockets 40, 42. It should be noted that the straight surfaces 54, 56 are angled slightly away from each other in an upward direction, and the surfaces 90, 92 are formed as straight surfaces angled in a similar manner to cooperate with the surfaces 54, 56 in slight wedging engagement when the shield 22 is fully in place, and to provide for a quick release of the shield 22 from the base as the surfaces 90, 92 are moved out of contact with the surfaces 54, 56. In addition, the sockets 40, 42 are provided with lower contact surfaces 94, 96 for cooperating with corresponding surfaces 98, 100 on the shield 22 to provide a bottom stop for the shield 22 as it is inserted into the base 20. The lap belt 16 and shoulder belt 18 are positioned in the slots 70, 72 to thereby retain the shield 22 in position on the base 20 as well as to maintain the booster seat 10 in position on the vehicle seat 12.

As mentioned previously, the shoulder belt attachment strap 26 is attached to the base 20, and is preferably attached at a central connection point 102 (see FIG. 2) on the bottom of the base 20 whereby the strap 26 is permitted to extend upwardly along either side 34 or 36 of the base. The strap 26 is used in the event that it is desired to use the base 20 without the shield 22. The strap 26 includes a free end 104 to which is attached a shoulder belt retention member 106. The retention member 106 is formed of a flexible material having opposing ends 108, 110 (see FIG. 1) which are adapted to be attached to each other by conventional means, such as hook and loop fastener material or snaps. The ends 108, 110 are attached to each other to surround a shoulder belt 18 in order to maintain the shoulder belt 18 in a predetermined position relative to the booster seat 10. Thus, when a child is positioned on the base 20 without the shield 22, the strap 26 will hold the shoulder belt 18 in a preferred position while the lap belt 16 may extend through the sockets 40, 42 to engage the child's lap.

By providing a strap 26 which may extend upwardly along either side 34, 36 of the base 20, the strap 26 is adapted to be used with shoulder belts extending across from either the right or left side of the booster seat 10. The strap 26 ensures that the shoulder belt 18 for the passenger restraint system is maintained in a downwardly biased position such that the shoulder belt 18 will not extend across a child's neck when the child is seated in the booster seat 10.

From the above description, it should be apparent that the booster seat 10 of the present invention may be conveniently located on a vehicle seat for supporting a child on the vehicle seat. In addition, the lap belt 16 of the restraint system is conveniently used to maintain the shield 22 in firm engagement with the base 20 of the booster seat while also maintaining the booster seat as a whole in position within the vehicle. It should further be noted that the slots 70, 72 of the shield 22 guide the lap belt 16 into close engagement with a child's lap seated on the booster seat 10 such that the lap belt 16 itself provides further positive restraint for the child in the event of an accident. Thus, the present booster seat utilizes a lap belt for a duel function of both maintaining the shield for the seat in place while also acting as a direct restraint for the child in the seat.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A child's booster seat for use in a vehicle having a vehicle seat and a vehicle passenger restraint system, said booster seat comprising:

a base including an upper surface for receiving a child in a sitting position and a lower surface for supporting said base on a vehicle seat;

said base including opposing sides defining first and second receptor portions;

a shield including opposing ends defining first and second engagement portions for cooperating with said receptor portions to position said shield extending across said base in front of a child seated on said base;

a seat belt receiving area defined by said shield for receiving a lap belt of a vehicle passenger restraint system whereby said booster seat is retained in position on the vehicle seat;

wherein said first and second engagement portions are slidably received in said first and second receptor portions, respectively, for attachment and removal of said shield to and from said base and wherein said seat belt receiving area comprises first and second slots defined in said opposing ends of said shield adjacent to said first and second engagement portions such that a lap belt located in said slots will be positioned for engagement with the lap of a child seated on said base.

2. The booster seat as recited in claim 1 wherein said receptor portions comprise receptor surfaces on said base defining upwardly facing sockets, and said engagement portions comprise engagement surfaces corresponding to said receptor surfaces.

3. The booster seat as recited in claim 2 wherein said receptor surfaces comprise a pair of generally vertically extending, straight surfaces facing each other at each of said first and second receptor portions.

4. The booster seat as recited in claim 1 including a shoulder belt adjustment strap including a first end attached to said base, and a second end for attachment to a shoulder belt of a vehicle passenger restraint system.

5. The booster seat as recited in claim 4 wherein said shoulder belt adjustment strap is positioned to extend from a bottom portion of said base to engage a shoulder belt.

6. The booster seat as recited in claim 5 wherein said shoulder belt adjustment strap is further positioned to extend upwardly from either side of said base.

7. A child's booster seat for use in a vehicle having a vehicle seat and vehicle passenger restraint system, said booster seat comprising:

a base including an upper surface for receiving a child in a sitting position and a lower surface for supporting said base on a vehicle seat;

said base including opposing sides defining first and second receptor portions;

a movable shield including opposing ends defining first and second engagement portions for cooperating with said receptor portions to position said shield extending across said base in front of a child seated on said base;

a seat belt receiving area defined by said shield for receiving a lap belt of a vehicle passenger restraint system; and wherein said seat belt receiving area positions the lap belt below said shield such that the lap belt and said shield each form a restraint for engaging and restraining a child seated on said base.

8. The booster seat as recited in claim 7 wherein said seat belt receiving area positions a lap belt to retain said booster seat in position on a vehicle seat.

9. The booster seat as recited in claim 7 wherein said seat belt receiving area comprises first and second slots defined in said opposing ends, said slots facing toward a front end of said booster seat.

10. The booster seat as recited in claim 7 wherein said receptor, portions comprise receptor surfaces on said base defining upwardly facing sockets, and said engagement portions comprise engagement surfaces corresponding to said receptor surfaces.

11. The booster seat as recited in claim 7 wherein said first and second receptor portions each comprise a pair of generally vertical surfaces facing toward each other and forming sockets at said opposing sides for receiving corresponding surfaces of said first and second engagement portions in sliding engagement.

12. The booster seat as recited in claim 7 including a shoulder belt adjustment strap attached to said base and including an end for attachment to a shoulder belt of a vehicle restraint system to position the shoulder belt downwardly on a child seated in said booster seat.

13. A child's booster seat for use in a vehicle having a vehicle seat and vehicle passenger restraint system, said booster seat comprising:

a base including opposing sides, an upper surface located between said opposing sides for receiving a child in a sitting position and a lower surface for supporting said base on a vehicle seat;

a shield including opposing ends for supporting said shield at said opposing sides of said base, and a central barrier portion extending between said opposing ends and across said base wherein said shield is movable relative to said base to facilitate positioning a child on said base; and a seat belt receiving area defined by said shield for receiving a lap belt of a vehicle passenger restraint system wherein said seat belt receiving area positions the lap belt below said central barrier portion for engagement with the lap of a child seated on said base such that the lap belt and said central barrier portion each form a restraint for engaging a child seated on said base portion.

14. The booster seat as recited in claim 13 wherein said seat belt receiving area positions a lap belt to retain said booster seat in position on a vehicle seat.

15. The booster seat as recited in claim 13 wherein said seat belt receiving area comprises first and second slots defined in said opposing ends, said slots facing toward a front end of said booster seat.

16. A child's booster seat for use in a vehicle having a vehicle seat and vehicle passenger restraint system, said booster seat comprising:

a base including an upper surface for receiving a child in a sitting position and a lower surface for supporting said base on a vehicle seat;

said base including opposing sides defining first and second receptor portions;

a shield including opposing ends defining first and second engagement portions for cooperating with said receptor portions to position said shield extending across said base in front of a child seated on said base;

a seat belt receiving area defined by said shield for receiving a lap belt of a vehicle passenger restraint system wherein said seat belt receiving area positions the lap belt for engagement with the lap of a child seated on said base; and a shoulder belt adjustment strap including a first end attached to said base, and a second end for attachment to a shoulder belt of a vehicle passenger restraint system.

17. The booster seat as recited in claim 16 wherein said shoulder belt adjustment strap is positioned to extend from a bottom portion of said base to engage a shoulder belt.

18. The booster seat as recited in claim 17 wherein said shoulder belt adjustment strap is further positioned to extend upwardly from either side of said base.

* * * * *